United States Patent
Shim et al.

(10) Patent No.: US 10,541,473 B2
(45) Date of Patent: Jan. 21, 2020

(54) METHOD AND DEVICE FOR CALIBRATING ANTENNA PHASE IN WIRELESS COMMUNICATION SYSTEMS USING UNLICENSED BAND

(71) Applicant: Samsung Electronics Co., Ltd., Suwon-si, Gyeonggi-do (KR)

(72) Inventors: Seijoon Shim, Seoul (KR); Hayoung Yang, Yongin-si (KR); Chongdon Kim, Seongnam-si (KR); Chanho Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/331,906

(22) PCT Filed: Sep. 12, 2017

(86) PCT No.: PCT/KR2017/009989
§ 371 (c)(1),
(2) Date: Mar. 8, 2019

(87) PCT Pub. No.: WO2018/048285
PCT Pub. Date: Mar. 15, 2018

(65) Prior Publication Data
US 2019/0207309 A1 Jul. 4, 2019

(30) Foreign Application Priority Data
Sep. 12, 2016 (KR) .................. 10-2016-0117606

(51) Int. Cl.
*H01Q 3/30* (2006.01)
*H04B 17/12* (2015.01)
*H04B 17/21* (2015.01)

(52) U.S. Cl.
CPC ............ *H01Q 3/30* (2013.01); *H04B 17/12* (2015.01); *H04B 17/21* (2015.01)

(58) Field of Classification Search
CPC combination set(s) only.
See application file for complete search history.

(56) References Cited

U.S. PATENT DOCUMENTS

2005/0277423 A1 12/2005 Sandhu et al.
2010/0093282 A1 4/2010 Martikkala et al.
(Continued)

FOREIGN PATENT DOCUMENTS

EP 1710960 A2 10/2006
KR 10-2016-0037749 A 4/2016

OTHER PUBLICATIONS

ISA/KR, "International Search Report and Written Opinion of the International Searching Authority," International Application No. PCT/KR2017/009989, dated Dec. 12, 2017, 9 pages.
(Continued)

*Primary Examiner* — Junpeng Chen (57) ABSTRACT

The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and an IoT-related technology. An operation method of an inter-antenna phase calibration device in a wireless communication system using an unlicensed band according to an embodiment of the present invention comprises the steps of: calculating a listen before talk (LBT) processing time while an LBT is being performed; selecting a calibration mode for calibrating an
(Continued)

inter-antenna phase on the basis of the LBT processing time; and calibrating the inter-antenna phase according to the selected calibration mode.

15 Claims, 9 Drawing Sheets

(56) References Cited

U.S. PATENT DOCUMENTS

| | | | |
|---|---|---|---|
| 2013/0063193 A1 | 3/2013 | Zhang | |
| 2013/0113535 A1 | 5/2013 | Haralabidis | |
| 2015/0146584 A1 | 5/2015 | Wang et al. | |
| 2015/0250002 A1 | 9/2015 | Sun et al. | |
| 2016/0049995 A1* | 2/2016 | Andre | H04B 7/04 370/277 |
| 2017/0202018 A1 | 7/2017 | Cha et al. | |
| 2017/0234971 A1* | 8/2017 | Arai | H04B 17/12 342/174 |
| 2017/0339717 A1* | 11/2017 | Futaki | H04W 16/14 |
| 2018/0020359 A1* | 1/2018 | Belghoul | H04L 5/0062 |
| 2018/0077581 A1* | 3/2018 | Ahn | H04W 74/08 |
| 2019/0053087 A1* | 2/2019 | Callender | H04B 17/309 |

OTHER PUBLICATIONS

Lenovo, "Remaining Issues of LBT Mechanism for LAA Uplink," R1-167509, 3GPP TSG RAN WG1 Meeting #86, Gothenburg, Sweden, Aug. 22-26, 2016, 5 pages.

Supplementary European Search Report dated Jun. 14, 2019 in connection with European Patent Application No. 17 84 9169, 7 pages.

* cited by examiner

METHOD AND DEVICE FOR CALIBRATING ANTENNA PHASE IN WIRELESS COMMUNICATION SYSTEMS USING UNLICENSED BAND

CROSS-REFERENCE TO RELATED APPLICATIONS

This application is a 371 National Stage of international Application No. PCT/KR2017/009989, filed Sep. 12, 2017, which claims priority to Korean Patent Application No. 10-2016-0117606, filed Sep. 12, 2016, the disclosures of which are herein incorporated by reference in their entirety.

BACKGROUND

1. Field

The present invention proposes an antenna calibration method and structure for use of a beamforming service in a long term evolution (LTE) system exploiting unlicensed bands. Here, the term "unlicensed band LTE system" is intended to include a licensed-assisted access (LAA) and LTE in unlicensed spectrum (LTE-U) system.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Antenna calibration is a technique for aligning phases of antennas based on previously acquired antenna phase information as a necessary part of a transmission scheme, such as beamforming, exploiting the antenna phase information. In order to implement the antenna calibration technique, it is necessary to estimate per-antenna phases based on a predetermined calibration signal.

In a licensed band communication system, the antenna phase calibration for beamforming is performed during data transmission suspension (off-service) or with no data transmission suspension (on-service) by exploiting a time division duplexing (TDD) guard period, thereby having no impact from data transmission.

The reason why the calibration should be performed with no impact from any data transmission is that the data transmission affects, if the data transmission and phase estimation processes are not isolated from each other during the per-antenna phase estimation (which is performed based on a calibration signal that is generated by a modem and looped back to an Rx receiver), the calibration signal-based phase estimation, which results in degradation of phase estimation performance.

Unlike the legacy licensed band communication, unlicensed band communication entails carrier sensing before data transmission. There is therefore a need to conduct research on a method for calibrating antenna phases suitable for the unlicensed band communication in consideration of the carrier sensing process.

SUMMARY

The present invention provides a method and device for calibrating phases of antennas without any performance degradation in a wireless communication system exploiting unlicensed bands.

In accordance with an aspect of the present invention, an operation method of an inter-antenna phase calibration device in a wireless communication system operating in an unlicensed band includes calculating a listen-before-talk (LBT) processing time during an LBT operation, selecting a calibration mode for calibrating phases of antennas based on the LBT processing time, and calibrating the phases of the antennas in the selected calibration mode.

Preferably, the calibration mode is a way for transmitting antenna-specific calibration signals for calibrating the phases of the antennas through pre-configured paths between an antenna module and a modem.

Preferably, the calibration mode is one of a time division mode in which the calibration signals are transmitted through pre-configured paths at antenna-specific time points, a frequency division mode in which the calibration signals are transmitted through pre-configured paths on antenna-specific frequencies, a code division mode in which the calibration signals are transmitted through pre-configured paths with antenna-specific orthogonal code sequences.

Preferably, selecting the calibration mode includes comparing the LBT processing time with a first calibration processing time and selecting, if the LBT processing time is greater than the first calibration processing time, the time division calibration mode or the frequency division calibration mode.

Preferably, selecting the calibration mode includes comparing, if the LBT processing time is equal to or less than the first calibration processing time, the LBT processing time with a second calibration processing time and selecting, if the LBT processing time is greater than the second calibration processing time, the code division calibration mode.

Preferably, the code division calibration mode is associated with one of Walsh codes, Hadamard codes, Zadoff-Chu code, and the like that preserve orthogonality.

Preferably, the LBT processing time is determined based on an LBT priority class.

Preferably, the first calibration processing time is determined based on a number of transmit antennas, a time required for calibrating phases of the antennas, and a time required for verifying the calibrations, the first calibration processing time varying with subcarrier.

Preferably, the second calibration processing time is determined based on a time required for calibrating phases of the antennas and a time required for verifying the calibrations, the second calibration processing time varying with subband.

In accordance with another aspect of the present invention, an inter-antenna phase calibration device in a wireless communication system operating in an unlicensed band includes a transceiver which is configured to transmit and receive signals and a controller configured to control to calculate a listen-before-talk (LBT) processing time during an LBT operation, select a calibration mode for calibrating phases of antennas based on the LBT processing time, and calibrate the phases of the antennas in the selected calibration mode.

The antenna phase calibration method and device of the present invention is advantageous in terms of calibrating phases of antennas without any performance degradation in an unlicensed band and being capable of performing antenna phase calibration during a listen-before-talk (LBT) procedure.

DETAILED DESCRIPTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings. In practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user an operator, usage, etc. Therefore, the definition should be made on the basis of the overall content of the present specification. In the following description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. The term "downlink (DL)" denotes a radio transmission path from a base station to a terminal, and the terminal "uplink (UL)" denotes a radio transmission path from the terminal to the base station. Although the description is directed to an LTE or LTE-A system by way of example, the present invention is applicable to other communication systems having a similar technical background and channel format. For example, the present invention is applicable to the 5G mobile communication technology (5G new radio (NR)) under development after LTE-A. It will be understood by those skilled in the art that the present invention can be applied even to other communication systems with a slight modification without departing from the spirit and scope of the present invention.

Antenna calibration is a technique for aligning phases of antennas based on previously acquired antenna phase information, which is necessary for a transmission scheme, such as beamforming, exploiting the antenna phase information. In order to implement the antenna calibration technique, it is necessary to estimate per-antenna phases based on a predetermined calibration signal.

The present invention proposes an antenna calibration method and structure for use of a beamforming service in an unlicensed band LTE system. Here, the term "unlicensed band LTE system" is intended to include a licensed-assisted access (LAA) and LTE in unlicensed spectrum (LTE-U) system.

The LAA system is characterized by using a type-3 frame structure for transmitting/receiving data in an unlicensed band and detecting an energy and a Wi-Fi preamble to transmit data only when the transmission channel is empty. This listen-before-talk (LBT) operation is performed through a unique carrier sensing operation. In the LAA system, uplink and downlink bands are not discerned, and the standard does not limit the transmission modes (TMs) supporting any beamforming (BF), such as TM 8/9/10. Accordingly, the TMs supporting BF should entail transmission (Tx) antenna-specific phase calibrations.

Likewise, the LTE-U system employs the LBT or exploits a transmission-off period during which LTE data transmission is suspended in order for Wi-Fi devices to transmit data, for Wi-Fi coexistence. Also, because there is no specific limitation on BF transmission in the LTE-U system, the TMs supporting BF should entail Tx antenna-specific phase calibrations.

The present invention proposes an antenna calibration method and structure for use in a system operating in an LBT mode, such as LAA and LTE-U.

Figure 1:
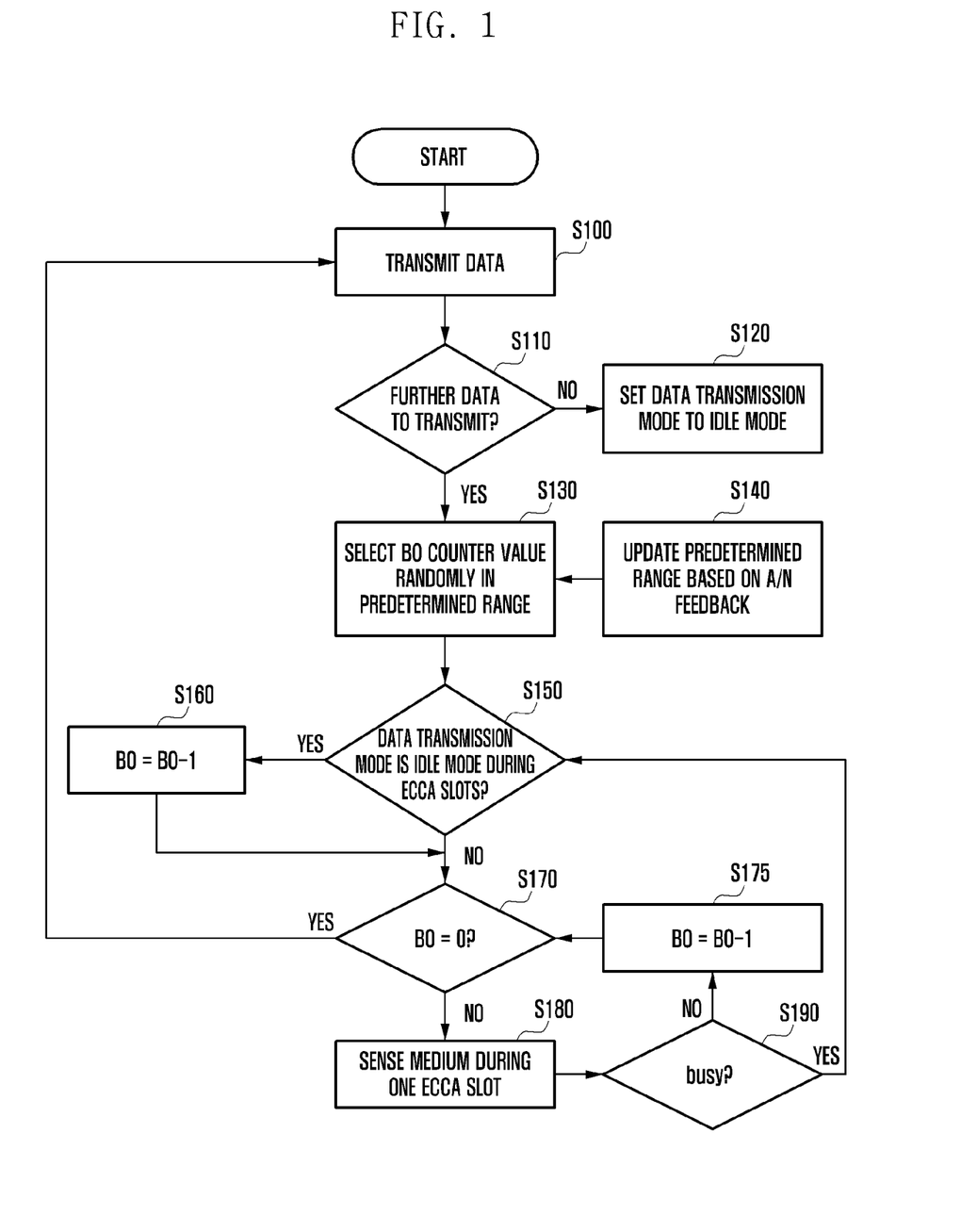
FIG. 1 is a flowchart illustrating an LBT procedure in an LAA system.

FIG. 1 is a flowchart illustrating an LBT procedure in an LAA system.

The LBT operation is performed in an unlicensed band in such a way of sensing a carrier by the extended clear channel assessment (ECCA) period of 9 us and determining a time period adequate for data transmission using a randomly selected back-off (BO) counter.

The LBT procedure should be performed before transmitting data in the unlicensed band according to a protocol. Accordingly, in a communication system that exploits an unlicensed band, such as an LAA system, the antenna calibration should be performed in consideration of the LBT procedure. Even in a licensed band, the antenna calibration should be performed so as not to disrupt a scheduled data transmission.

The present invention proposes a method for performing the antenna calibration during a carrier sensing operation in an unlicensed band LTE communication system such as the LAA and LTE-U systems. Because it is necessary to continue monitoring the carrier for data transmission via a receive antenna, the corresponding receive antenna path should be structured to differ from the antenna paths that need calibrating.

The LAA and LTE-U systems employ the same symbol duration and subcarrier tone spacing as the legacy LTE system. That is, the symbol duration of the minimum calibration symbol is about 70 us. However, the time required for the LBT procedure in the LAA system varies in the range from 27 us to a few ms according to a defer period and a BO count.

Accordingly, in order to perform the antenna calibration during the LBT procedure, it is necessary to complete the calibration operation on multiple antennas within a limited time period; thus, there is a need of a method for performing the calibration operation only when the time required for the LBT operation is longer than the time required for the calibration operation.

FIG. 1 shows an operation method of a device that performs an LBT operation in an LAA system.

At step S100, the device which is performing the LBT operation may transmit data. At step 110, the device may determine whether to transmit further data.

If it is determined at step S110 that there is no further data to transmit, the device may set its data transmission mode to an idle mode at step S120.

If it is determined at step S110 that there is further data to transmit, the device may randomly select a BO counter value in a predetermined range at step S130. The predetermined range may be updated according to an acknowledgement/negative-acknowledgement (A/N) feedback at step S140. The predetermined range may be equal to a contention window size and expressed as [0, Q-1].

At step S150, the device may check the defer period to determine whether the data transmission mode is the idle mode during the ECCA slots in a deferred period. If it is determined that the data transmission mode is the idle mode during the ECCA slots, the device may decrease the BO counter value by 1 at step S160. If it is determined that the data transmission mode is not the idle mode during the ECCA slots, the device may determine at step S170 whether the BO counter value is 0. If it is determined that the BO counter value is 0, the procedure goes to step S100, at which the device may transmit data.

If it is determined at step S170 that the BO counter value is not 0, the device may sense the medium during one ECCA slot at step S180. That is, the LBT operation may be performed in the unlicensed band in such a way of sensing the carrier by the ECCA period of 9 us.

The device may determine at step S190 whether its data transmission mode is a busy mode. If it is determined that the data transmission mode is the busy mode, the procedure goes to step S150 such that the device performs subsequent operations.

If it is determined at step S190 that the data transmission mode is not the busy mode, the device may decrease the BO counter value by 1, and the procedure goes to step S170 such that the device performs subsequent operations.

Figure 2:
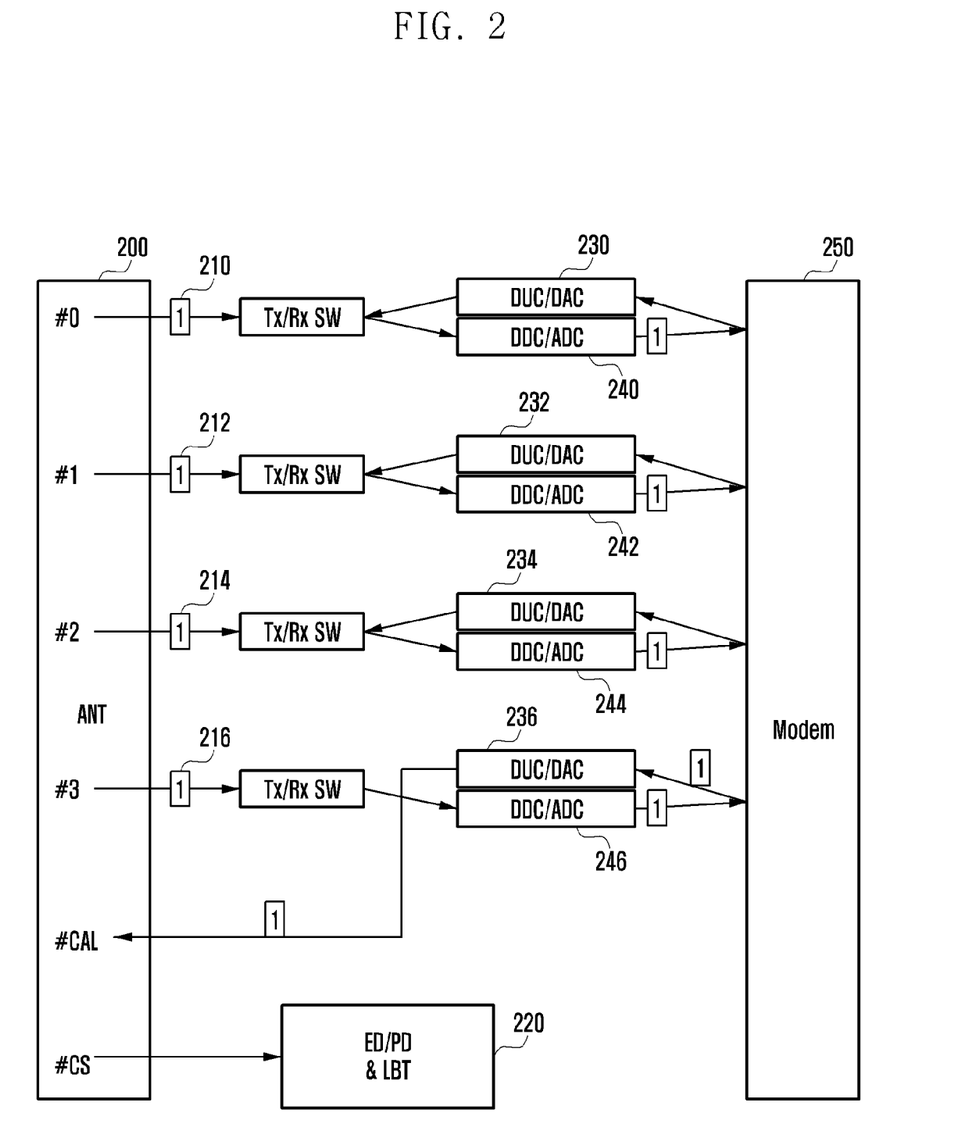
FIG. 2 is a diagram illustrating data flows associated with an uplink calibration in an unlicensed band LTE system according to an embodiment of the present invention.
Figure 3:
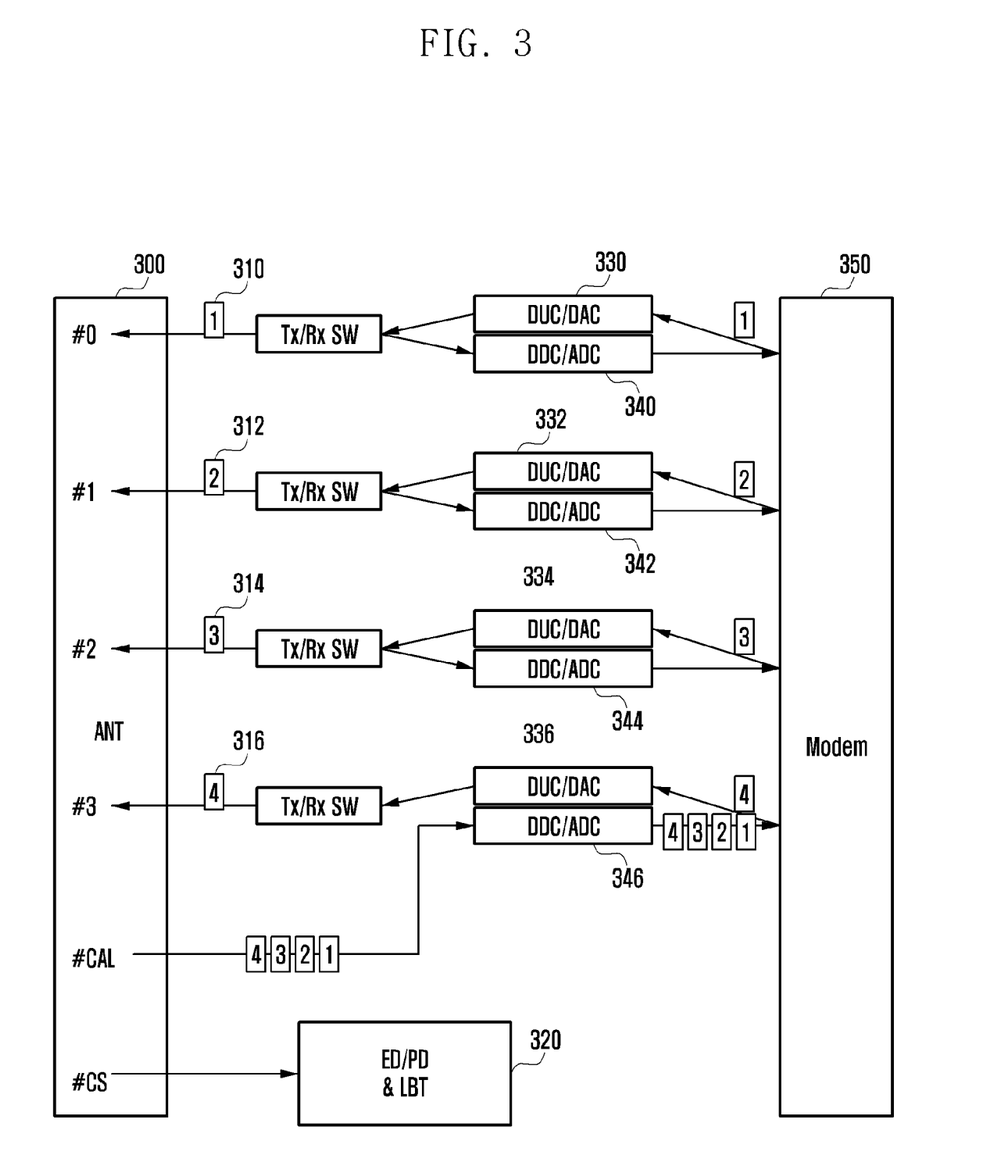
FIG. 3 is a diagram illustrating data flows associated with a downlink calibration in an unlicensed band LTE system according to an embodiment of the present invention.

FIG. 2 is a diagram illustrating data flows associated with an uplink calibration in an unlicensed band LTE system according to an embodiment of the present invention, and FIG. 3 is a diagram illustrating data flows associated with a downlink calibration in an unlicensed band LTE system according to an embodiment of the present invention.

In reference to FIGS. 2 and 3, the antenna modules 200 and 300 each have multiple antenna ports #0 to #3, a calibration port #0 CAL, and a carrier sensing port # CS. In this disclosure, the path established between the calibration port # CAL and a modem 250 (or 350) may be referred to as the calibration path.

The carrier sensing port # CS is connected to an LBT block 220, which may perform energy detection and power detection to control (or process) the LBT operation.

Furthermore, there may be a plurality of Tx/Rx SWs, digital up-converters (DUCs), digital-to-analog converters (DACs), digital down-converters (DDCs), and analog-to-digital converters (ADCs) interposed between the antenna modules 200 and 300 and the modems 250 and 350.

In order to apply a Tx beamforming, it is necessary to perform the uplink (UL) calibration for calibrating Rx antennas as well as the downlink (DL) calibration for calibrating Tx antennas because Tx BF weights for use in Tx beamforming are calculated based on uplink channel information estimated under the assumption of channel reciprocity.

The UL calibration may be performed in such a way that the modem 250 transmits a calibration signal to the antennas #0 to #3 of the antenna module 200 through the calibration paths and receives the signals looped back from the respective antennas as shown in FIG. 2.

The modem 250 calculates phases of the respective antennas #0 to #3 of the antenna module 200 based on the signals looped back from the respective antennas #0 to #3 of the antenna module 200. Because it is possible to clearly distinguish the signals looped back from the respective antennas from each other in the UL calibration procedure, no restriction is required in time, frequency, and code for transmitting the calibration signal.

In the DL calibration procedure depicted in FIG. 3, however, the modem 350 transmits DL calibration signals 1, 2, 3, and 4 to the respective Tx antennas #0 to #3 of the antenna module 300 and receives signals looped back from the antenna module 300 in a combined manner through a calibration Rx path # CAL 350.

The modem 350 estimates antenna phases based on the calibration signals looped back in this way. Accordingly, the signals 1, 2, 3, and 4 should be generated to differ in time, frequency, or code such that the modem 350 is capable of distinguishing from each other the signals looped back from the antennas #0 to #3 of the antenna module 300.

That is, the calibration signals should be transmitted at different time slots in the time domain, in different subbands in the frequency domain, or with different orthogonal code sequences in the code domain.

The present invention proposes time division, frequency division, and code division DL calibration signal structures and a method for calculating an LBT processing time depending on the DL calibration signal structure. The DL calibration signal structures are described with reference to FIGS. 4 to 6.

Figure 4:
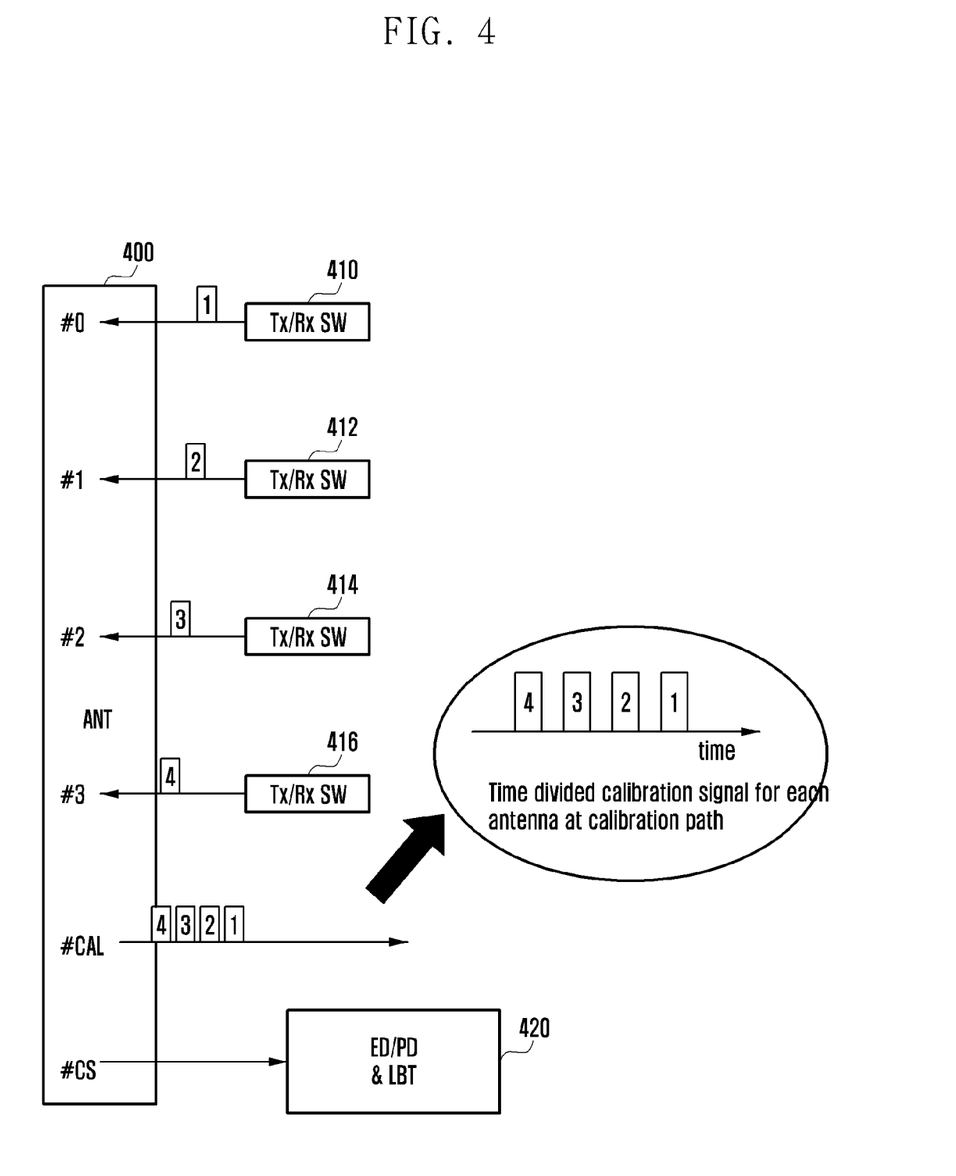
FIG. 4 is a diagram illustrating a time division calibration signal structure according to an embodiment of the present invention.

FIG. 4 is a diagram illustrating a time division calibration signal structure according to an embodiment of the present invention.

In reference to FIG. 4, the time division calibration signal structure is designed such that the Tx antenna-specific DL calibration signals are transmitted in different time slots. The respective calibration signals are transmitted as full bandwidth calibration-capable signals to calibrate antennas in series at a time interval.

In the case of using this calibration structure, the required LBT processing time satisfies the relationship of Formula 1.

$$\text{LBT processing time} \geq (\text{\# of Tx antennas}) \times (\text{calibration phase calculation time} + \text{calibration verification time}) = \text{calibration processing time} \qquad \text{Formula 1}$$

Here, "# of Tx antennas" denotes the number of Tx antennas, "calibration phase calculation time" denotes the time required for calculating phases after the transmitted calibration signals have been looped back to the modem, and "calibration verification time" denotes the time required for the modem to verify whether the calibrations are correctly conducted after phase compensation at the modem that follows the phase calculation.

That is, the LBT processing time should be equal to or longer than the calibration processing time in the time division calibration signal structure.

Figure 5:
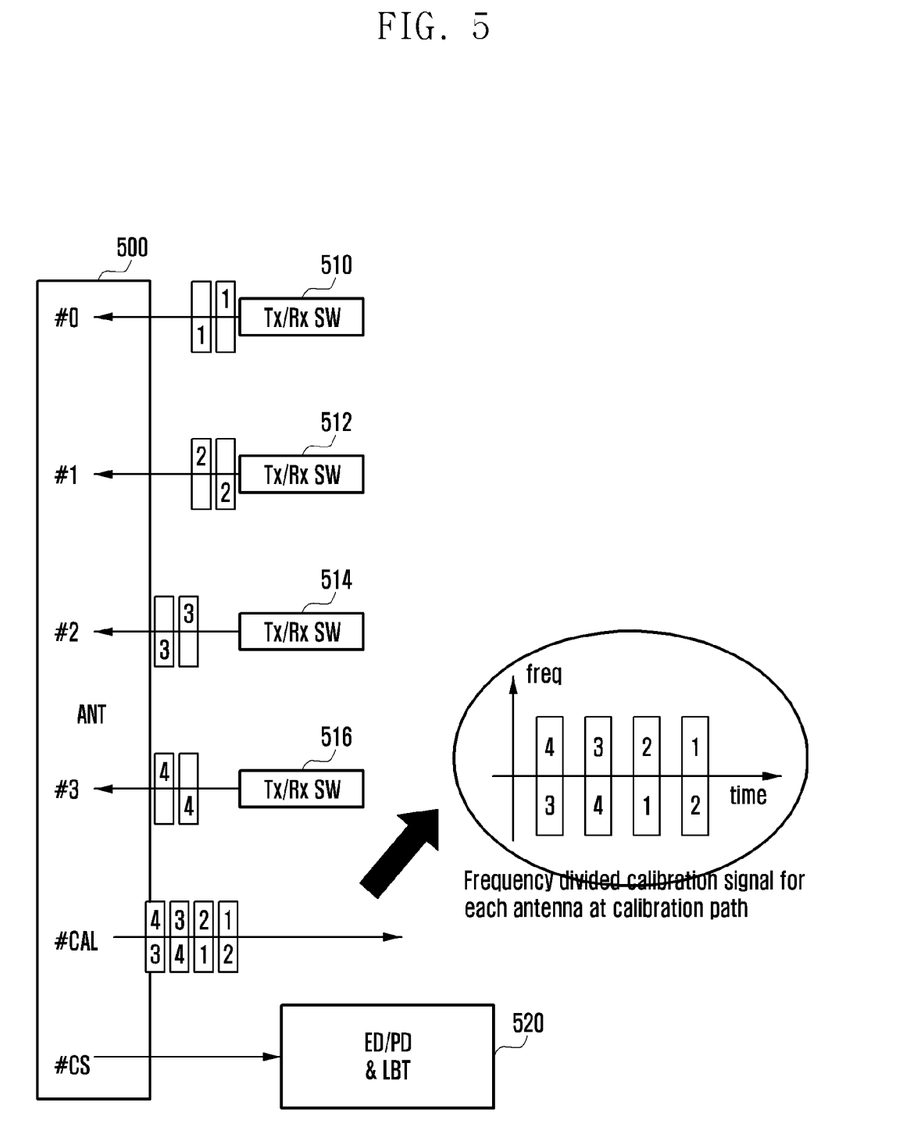
FIG. 5 is a diagram illustrating a frequency division calibration signal structure according to an embodiment of the present invention

FIG. 5 is a diagram illustrating a frequency division calibration signal structure according to an embodiment of the present invention.

In reference to FIG. 5, the frequency division calibration signal structure is designed such that the Tx antenna-specific DL calibration signals are transmitted in different frequency subbands. The respective calibration signals are transmitted as subband calibration-capable signals to simultaneously calibrate the antennas operating on different subbands. In the case of using this calibration structure, the required LBT processing time satisfies the relationship of Formula 2.

LBT processing time≥((# of Tx antennas)/(# of subbands))×# of subbands×(calibration phase calculation time+calibration verification time)=# of Tx antennas×(calibration phase calculation time+calibration verification time)=calibration processing time    Formula 2

Here, "# of Tx antennas" denotes the number of Tx antennas, "# of subbands" denotes the number of subbands, "calibration phase calculation time" denotes the time required for calculating phases after transmitted calibration signals have been looped back to the modem, and "calibration verification time" denotes the time required for the modem to verify whether the calibrations are correctly conducted after phase compensation at the modem that follows the phase calculation.

That is, the LBT processing time should be equal to or longer than the calibration processing time in the frequency division calibration signal structure.

Figure 6:
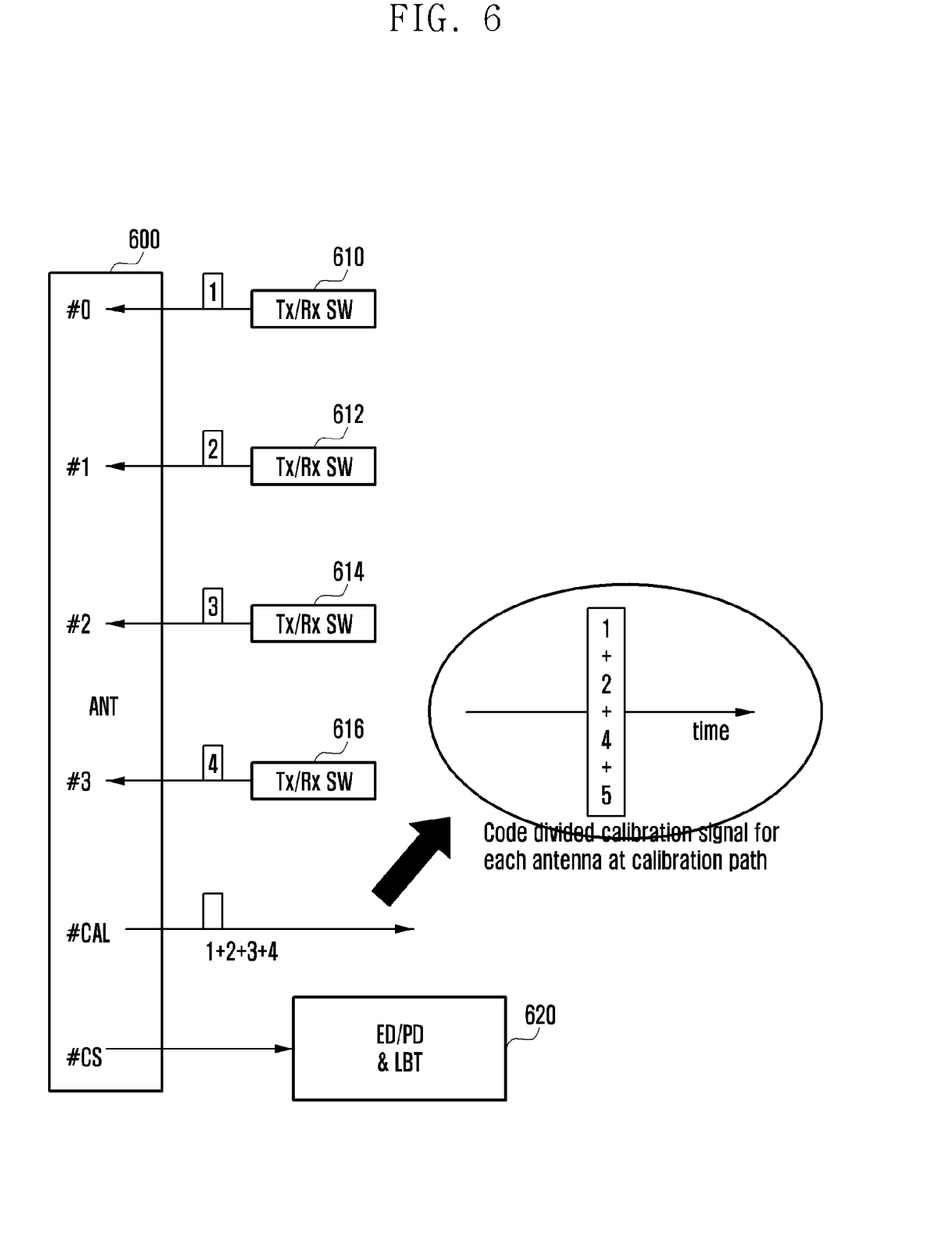
FIG. 6 is a diagram illustrating a code division calibration signal structure according to an embodiment of the present invention.

FIG. 6 is a diagram illustrating a code division calibration signal structure according to an embodiment of the present invention.

In reference to FIG. 6, the code division calibration signal structure is designed such that the Tx antenna-specific DL calibration signals are simultaneously transmitted as full bandwidth calibration-capable signals with different codes. The respective calibration signals are transmitted as full bandwidth calibration-capable signals. The antenna-specific calibration signals are simultaneously transmitted and simultaneously received, and the antennas are calibrated using the orthogonality property of the codes. In the case of using this calibration structure, the required LBT processing time satisfies the relationship of Formula 3.

LBT processing time≥(calibration phase calculation time+calibration verification time)=calibration processing time    Formula 3

Here, "calibration phase calculation time" denotes the time required for calculating phases after the transmitted calibration signals have been looped back to the modem, and "calibration verification time" denotes the time required for the modem to verify whether the calibrations are correctly conducted after phase compensation at the modem that follows the phase calculation.

That is, the LBT processing time should be equal to or longer than the calibration processing time in the code division calibration signal structure.

Because the antenna-specific calibration signals are simultaneously transmitted in the same time slot, the LBT processing time satisfying the relationship of Formula 3 is shorter than that for use in the time division and frequency division calibration signal structures.

Although the code division calibration scheme is advantageous in terms of the short LBT processing time, it also has shortcomings in terms of limit of sequences because of using the code orthogonality property and the calibration process complexity imposed by the necessity of distinguishing among the code-multiplexed antenna-specific signals. Furthermore, it is difficult to use the code division calibration scheme in an environment where the antenna phase response is frequency selective because the codes accumulated over a subband can be distinguished from each other only when the frequency characteristics of the antenna are flat on the subband. This causes a drawback of degrading flexibility of use of the code division calibration scheme in comparison with the time division and frequency division calibration schemes.

For use with the code division calibration signals, the code sequences have to meet the requirements as follows.

When accumulated per subband, the antenna-specific sequences can be distinguished from each other based on the code orthogonality property.

There is a need of orthogonal codes adequate in number at least for distinguishing among the antennas per subband.

If certain codes generate the code sequences fulfilling the requirements, the codes can be used for generating the code division calibration signals; such codes may include Walsh codes, Hadamard codes, Zadoff-Chu codes, and other codes guaranteeing orthogonality. Using the sequences with such characteristics, it may be possible to calculate per-antenna phase responses as follows.

$$Z(k) = \Sigma hm(k) * Xm(k)$$    Equation 4

Here, Xm(k) denotes a calibration signal corresponding to the kth frequency of the mth antenna among the calibration sequence signals, and hm(k) denotes a phase response corresponding to the kth subcarrier of the mth antenna. The signals Xm(k) being transmitted simultaneously by the respective antennas are combined, at the receiver, per antenna, and the signal being received over the kth frequency is expressed as Z(k).

Here, because $\Sigma_k X_l(k) X^*_m(k) = 0$ is fulfilled according to the code sequence characteristics, the response Rm(k) on the kth subcarrier of the mth antenna can be calculated by Equation 5 that is derived from equation 4.

$$R_m(k) = \frac{1}{N_{tone}} \sum_{k}^{N_{tone}} Z(k) X_m^*(k) =$$    Equation 5

$$h_m + \frac{1}{N_{tone}} \sum_{l \neq m} h_l \sum_{k} X_l(k) X_m^*(k) = h_m$$

Because Rm(k) is calculated via subband accumulation, the same response Rm(k) should be applied to N tone subcarriers. That is, it is necessary to assume that the antenna phase characteristics are flat in N tones of the subband.

The characteristics of the above-described three calibration schemes are summarized in Table 1.

TABLE 1

|  | Calibration processing time | Unit of calibration |
|---|---|---|
| Time division calibration | # of Tx antennas X (Calibration phase calculation time + Calibration verification time) | Subcarrier |
| Frequency division |  |  |

TABLE 1-continued

| | Calibration processing time | Unit of calibration |
|---|---|---|
| calibration | | |
| Code division calibration | Calibration phase calculation time + Calibration verification time | Subband |

As shown in Table 1, although requiring a calibration processing time long in comparison with the code division calibration scheme, the time/frequency division calibration scheme is capable of performing calibration by unit of a subcarrier across the full bandwidth, thereby improving calibration accuracy and being able to be applied to a situation requiring sufficient LBT time and demanding accurate calibration.

Meanwhile, although requiring relatively short calibration processing time, the code division calibration scheme in which calibration is performed by unit of a subband is appropriate for antenna phase tracking by subband during a short LBT time.

In the LAA and LTE-U systems, the time required for LBT-based carrier sensing has been predetermined according to the type of data to transmit. In the LAA system, the minimum and maximum LBT times have been determined by LBT priority class as listed in Table 2. That is, the minimum and maximum LBT times have been preconfigured, and a random variable called BO count determines the LBT time.

TABLE 2

| LBT priority class | Minimum LBT time (us) | Maximum LBT time (us) |
|---|---|---|
| 1 | 52 | 88 |
| 2 | 88 | 160 |
| 3 | 178 | 610 |
| 4 | 214 | 9286 |

In the LTE-U system, an LTE transmission on/off duration is variably determined according to the devices and data amount existing on the channel through a carrier sensing adaptation transmission scheme for Wi-Fi coexistence.

The present invention proposes a method for performing the calibration operation when the LBT execution time or off-transmission period is longer than the total calibration processing time required for calibrating all antennas. In the LAA system, it may be possible to pre-calculate the time required for LBT based on the LBT priority class of the data to be transmitted and select a calibration mode according to the LBT execution time. In the LTE-U system, it may be possible to select a calibration mode according to the off-transmission time period through a CSAT procedure.

Figure 7:
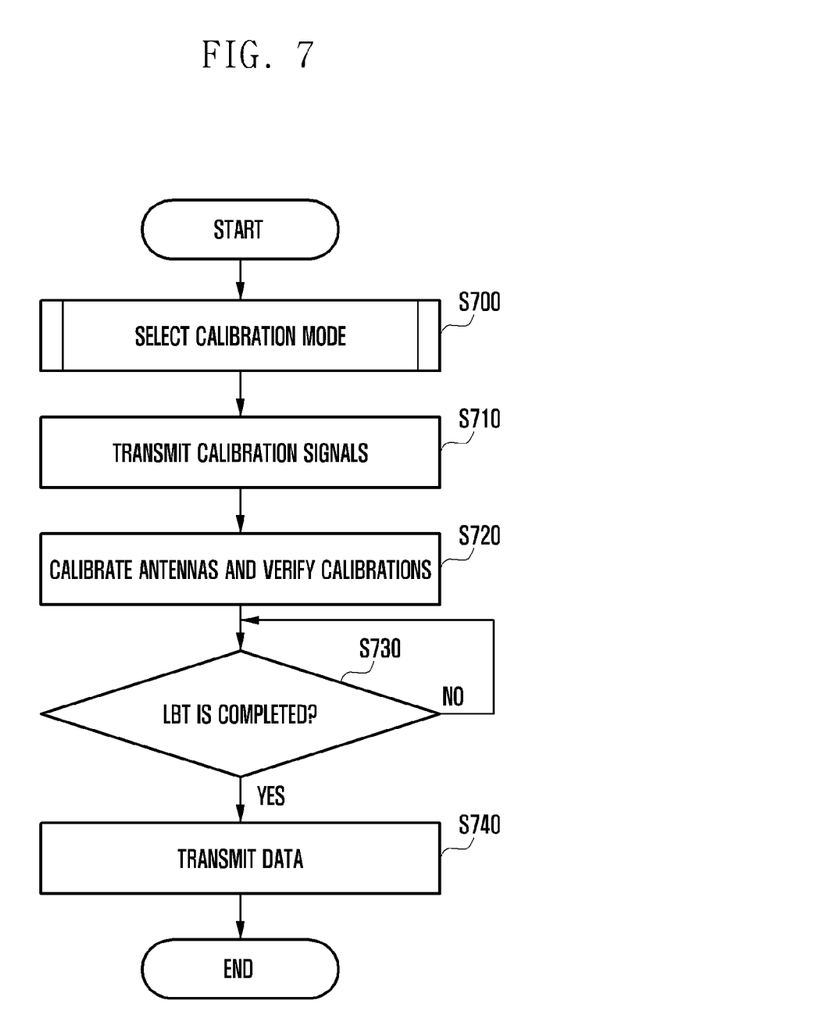
FIG. 7 is a flowchart illustrating an operation method of an inter-antenna phase calibration device in a wireless communication system according to an embodiment of the present invention.
Figure 8:
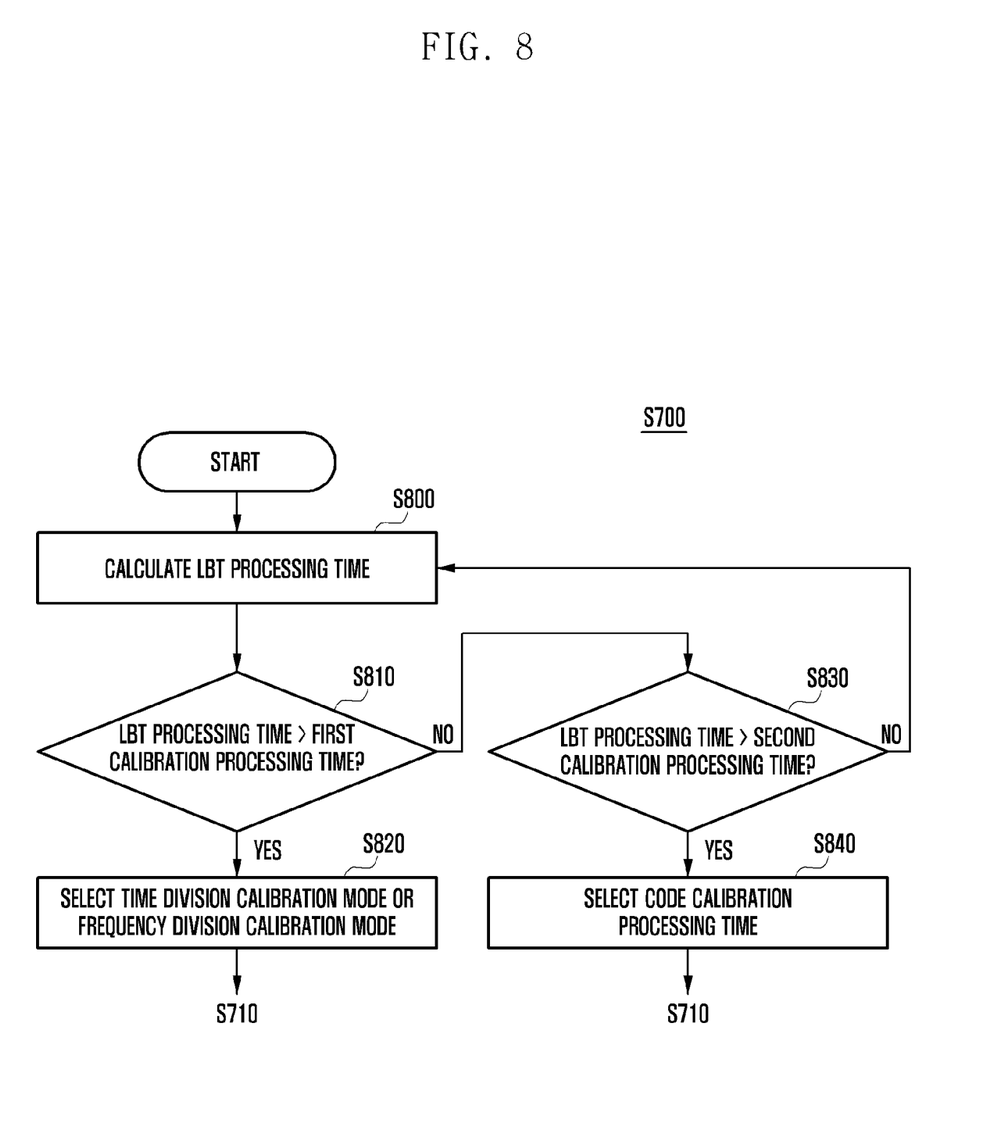
FIG. 8 is a flowchart illustrating a method for selecting a compensation mode at a step depicted in FIG. 7.

The above-described procedure is identical with the LAA calibration procedure of FIG. 7. This procedure may be applicable to the LTE-U system by substituting "LBT processing time" for "off-transmission time" as shown in FIG. 8.

FIG. 7 is a flowchart illustrating an operation method of an inter-antenna phase calibration device in a wireless communication system according to an embodiment of the present invention. The inter-antenna phase calibration device may perform the calibration procedure in an LAA system as shown in FIG. 7.

The inter-antenna phase calibration device may be implemented inside a base station. According to an alternative embodiment, the inter-antenna phase calibration device may be implemented inside a terminal.

At step S700, the antenna phase calibration method may select a calibration mode. In the calibration mode, antenna-specific calibration signals are communicated between an antenna module and a modem through pre-configured paths for calibrating phases of antennas included in the antenna module.

According to an embodiment, the calibration mode may be one of a time division mode in which the calibration signals are transmitted through pre-configured paths at antenna-specific time points, a frequency division mode in which the calibration signals are transmitted through the pre-configured paths on antenna-specific frequencies, a code division mode in which the calibration signals are transmitted through the pre-configured paths with antenna-specific orthogonal code sequences.

The code division calibration mode may be associated with one of orthogonal codes such as Walsh codes, Hadamard codes, and Zadoff-Chu codes.

At step S710, the modem implemented inside the inter-antenna phase calibration device may transmit the calibration signals.

At step S720, the inter-antenna phase calibration device may perform antenna calibration and calibration verification. The inter-antenna phase calibration device may calculate phases of the antennas based on the calibration signals, compensate phases of the antennas, and verify the calibrations.

The inter-antenna phase calibration device may at step S730 determine whether an LBT operation is completed and, if it is determined that the LBT operation is completed, transmit data at step S740.

FIG. 8 is a flowchart illustrating a method for selecting a compensation mode at a step depicted in FIG. 7.

At step S800, the inter-antenna phase calibration device may calculate an LBT processing time. The LBT processing time may be determined according to the LBT priority class.

According to an embodiment, the LBT processing time may be determined in consideration of the minimum LBT time associated with the LBT priority class.

The inter-antenna phase calibration device may compare the LBT processing time with a first calibration processing time at step S810 and, if the LBT processing time is greater than the first calibration processing time, select the time division calibration mode or the frequency division calibration mode at step S820.

Here, the first calibration processing time may be determined based on a number of transmit antennas, a time required for calibrating phases of the antennas, and a time required for verifying the calibrations; the first calibration processing time may vary with the subcarrier.

If the LBT processing time is equal to or less than the first calibration processing time, the inter-antenna phase calibration device may compare the LBT processing time with a second calibration processing time at step S830 and, if the LBT processing time is greater than the second calibration processing time, select the code division calibration mode at step S840.

Here, the second calibration processing time may be determined based on the time required for calibrating the phases of the antennas and the time required for verifying the calibrations, and the second calibration processing time may vary with the subband.

Figure 9:
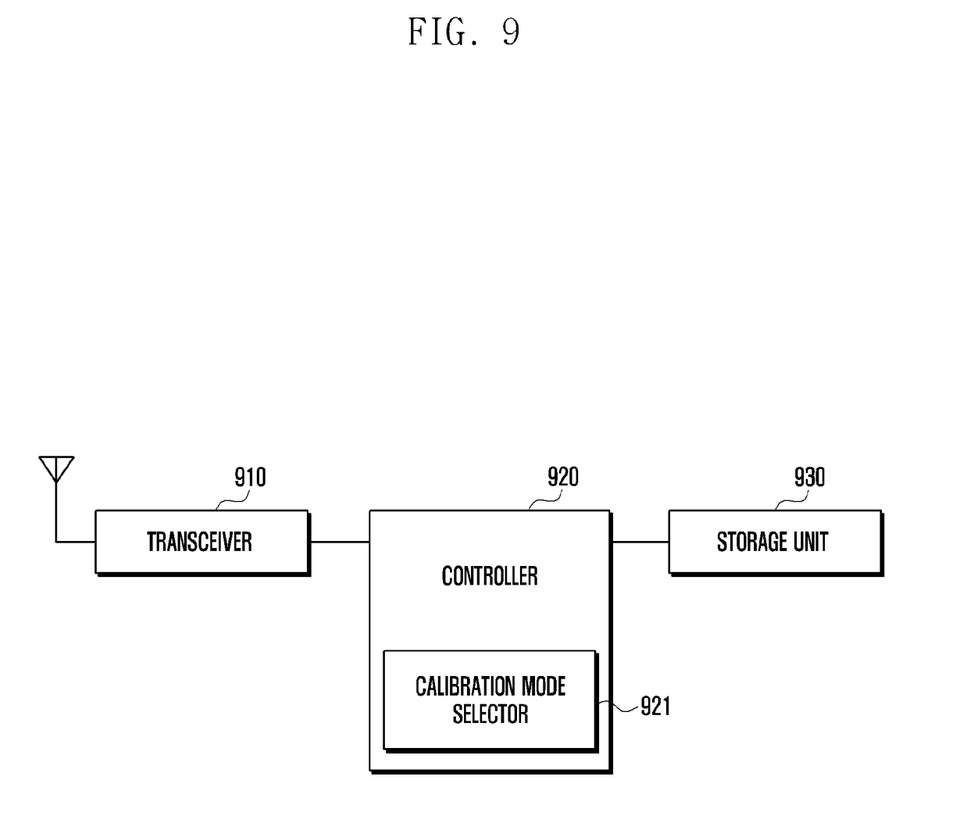
FIG. 9 is a block diagram illustrating a configuration of an inter-antenna phase calibration device in a wireless communication system according to an embodiment of the present invention.

FIG. 9 is a block diagram illustrating a configuration of an inter-antenna phase calibration device in a wireless communication system according to an embodiment of the present invention.

In reference to FIG. 9, the inter-antenna phase calibration device 900 may include a transceiver 910, a controller 920, and a storage unit 930.

The transceiver 910 is responsible for transmitting and receiving data during a wireless communication of the inter-antenna phase calibration device 900. The transceiver 910 may communicate signals with another node or device. The transceiver 910 may include an RF transmitter that up-converts and amplifies a transmit signal and an RF receiver that low-noise-amplifies and down-converts a receive signal.

The transceiver 910 may output the data received over a radio channel to the controller 920 and transmit data from the controller 920 over the radio channel.

The controller 920 may control signal flows among the function blocks in order for the inter-antenna phase calibration device 900 to operate as described in the embodiments of the present invention. In detail, the controller 920 may calculate the LBT processing time during the LBT operation, select a calibration mode for calibrating phases of antennas based on the LBT processing time, and calibrate the phases of the antennas in the selected calibration mode.

The calibration mode may be one of a time division mode in which the calibration signals are transmitted through pre-configured paths at antenna-specific time points, a frequency division mode in which the calibration signals are transmitted through the pre-configured paths on antenna-specific frequencies, and a code division mode in which the calibration signals are transmitted through the pre-configured paths with antenna-specific orthogonal code sequences.

In order to accomplish this function, the controller 920 may include a calibration mode selector 921.

The calibration mode selector 921 may compare the LBT processing time with a first calibration processing time and select, if the LBT processing time is greater than the first calibration processing time, the time division calibration mode or the frequency division calibration mode.

If the LBT processing time is equal to or less than the first calibration processing time, the calibration mode selector 921 may compare the LBT processing time with a second calibration processing time and select, if the LBT processing time is greater than the second calibration processing time, the code division calibration mode.

The storage unit 930 may store programs and data necessary for operations of the inter-antenna phase calibration device 900 and may be divided into a program region and a data region.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. An operation method of an inter-antenna phase calibration device in a wireless communication system operating in an unlicensed band, the operation method comprising:
    calculating a listen-before-talk (LBT) processing time during an LBT operation;
    selecting a calibration mode for calibrating phases of antennas based on the LBT processing time; and
    calibrating the phases of the antennas in the selected calibration mode.

2. The operation method of claim 1, wherein the calibration mode is a way for transmitting antenna-specific calibration signals for calibrating the phases of the antennas through pre-configured paths between an antenna module and a modem.

3. The operation method of claim 2, wherein the calibration mode is one of a time division mode in which the calibration signals are transmitted through the pre-configured paths at antenna-specific time points, a frequency division mode in which the calibration signals are transmitted through the pre-configured paths on antenna-specific frequencies, and a code division mode in which the calibration signals are transmitted through the pre-configured paths with antenna-specific orthogonal code sequences.

4. The operation method of claim 3, wherein selecting the calibration mode comprises:
    comparing the LBT processing time with a first calibration processing time; and
    selecting, if the LBT processing time is greater than the first calibration processing time, the time division calibration mode or the frequency division calibration mode.

5. The operation method of claim 4, wherein selecting the calibration mode comprises:
    comparing, if the LBT processing time is equal to or less than the first calibration processing time, the LBT processing time with a second calibration processing time; and
    selecting, if the LBT processing time is greater than the second calibration processing time, the code division calibration mode.

6. The operation method of claim 3, wherein the code division calibration mode is configured to use orthogonal codes.

7. The operation method of claim 1, wherein the LBT processing time is determined based on an LBT priority class.

8. The operation method of claim 5, wherein the first calibration processing time is determined based on a number of transmit antennas, a time required for calibrating phases of the antennas, and a time required for verifying the calibrations, the first calibration processing time varying with subcarrier.

9. The operation method of claim 5, wherein the second calibration processing time is determined based on a time required for calibrating phases of the antennas and a time required for verifying the calibrations, the second calibration processing time varying with subband.

10. An inter-antenna phase calibration device in a wireless communication system operating in an unlicensed band, the inter-antenna phase calibration device comprising:
    a transceiver configured to transmit and receive signals; and
    a controller configured to control to calculate a listen-before-talk (LBT) processing time during an LBT operation, select a calibration mode for calibrating phases of antennas based on the LBT processing time, and calibrate the phases of the antennas in the selected calibration mode.

11. The inter-antenna phase calibration device of claim 10, wherein the calibration mode is a way for transmitting antenna-specific calibration signals for calibrating the phases of the antennas through pre-configured paths between an antenna module and a modem.

12. The inter-antenna phase calibration device of claim 11, wherein the calibration mode is one of a time division mode in which the calibration signals are transmitted through the pre-configured paths at antenna-specific time points, a frequency division mode in which the calibration signals are transmitted through the pre-configured paths on antenna-specific frequencies, and a code division mode in which the calibration signals are transmitted through the pre-configured paths with antenna-specific orthogonal code sequences.

13. The inter-antenna phase calibration device of claim 12, wherein the controller is configured to control to compare the LBT processing time with a first calibration processing time and select, if the LBT processing time is greater than the first calibration processing time, the time division calibration mode or the frequency division calibration mode.

14. The inter-antenna phase calibration device of claim 12, wherein the controller is configured to control to compare, if the LBT processing time is equal to or less than the first calibration processing time, the LBT processing time with a second calibration processing time and select, if the LBT processing time is greater than the second calibration processing time, the code division calibration mode.

15. The inter-antenna phase calibration device of claim 12, wherein the code division calibration mode is configured to use orthogonal codes.

\* \* \* \* \*